J. B. COLLIN.
SUPPLYING LOCOMOTIVES WITH COAL.
No. 10,417. Reissued Dec. 4, 1883.
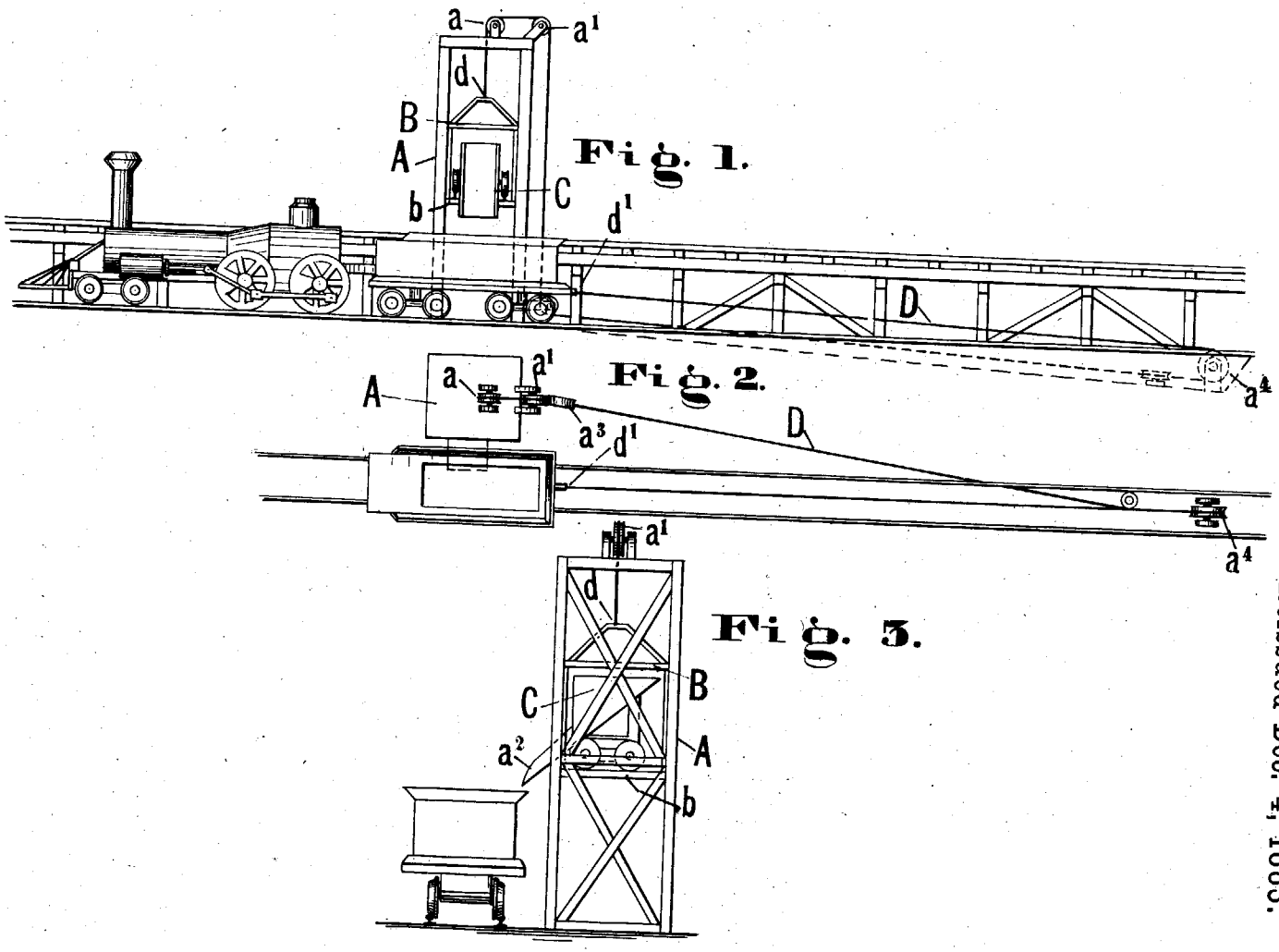
WITNESSES:
T. S. West.
Wm. T. Emerson.
INVENTOR:
J. B. COLLIN,
BY H. W. Beadle & Co.
ATTYS.

UNITED STATES PATENT OFFICE.

JOHN B. COLLIN, OF ALTOONA, PENNSYLVANIA.

SUPPLYING LOCOMOTIVES WITH COAL.

SPECIFICATION forming part of Reissued Letters Patent No. 10,417, dated December 4, 1883.

Original No. 245,350, dated August 9, 1881. Application for reissue filed November 3, 1883.

*To all whom it may concern:*

Be it known that I, JOHN B. COLLIN, of Altoona, county of Blair, and State of Pennsylvania, have invented new and useful Improvements in Hoisting Mechanisms; and I do hereby declare that the following is a full and exact description of the same, reference being had to the accompanying drawings, and to the letters of reference marked thereon.

This invention relates to that class of hoisting mechanisms which are specially designed for supplying locomotives with coal; and it consists in certain peculiarities of construction, fully described hereinafter, by means of which the desired results are obtained in a very simple manner.

In the drawings, Figure 1 represents a side elevation of a locomotive and a front elevation of the frame-work and hoisting mechanism used in connection therewith for elevating the coal; Fig. 2, a plan view of the locomotive-tender and the hoisting mechanism shown in Fig. 1, and Fig. 3 a rear end elevation of the tender and a side elevation of the frame-work and hoisting mechanism.

To enable others skilled in the art to make and use my invention, I will proceed to describe fully the construction of the same.

A represents a frame-work of proper construction rising to the proper height, which is provided above with the pulley $a$, located at the center of the frame, and the pulley $a'$, located at one side, as shown.

$a^2$ represents a permanent chute attached to the front side of the frame at the proper point, as shown.

B represents a cage or frame held within the frame-work A, in such manner as to be capable of free movement in a vertical direction, which is provided with a platform, $b$, adapted to receive a coal-car, C, of any proper construction, as shown in Figs. 1 and 3.

$a^3$ represents a pulley located near the base of the frame-work A, as shown in Fig. 2, and $a^4$ a pulley located between the rails of the track, at some distance from the frame-work, as shown.

D represents a rope or chain passing about the entire system of pulleys, as shown, one end, $d$, of which is adapted for attachment to the cage or frame B, and the other end, $d'$, to the locomotive E, as shown.

C represents the coal-car, of proper construction, before referred to, which is adapted to enter the cage or frame B.

The rope or chain D is of such length and its end $d'$ is attached to the locomotive at such a point that the movement of the locomotive, after the end $d'$ is attached thereto, into the proper position to receive the coal will elevate the car into the proper position to discharge its contents into the tender.

The operation is substantially as follows: The coal-car C, having been loaded and moved to the platform of the cage B by hand, is lifted at the proper time by the movement of the engine into the proper position to discharge the contents into the tender.

By means of the described construction and arrangement of parts, the desired result is obtained in a very simple manner.

I am aware that it is old to use the power of the engine to hoist fuel for supplying the tender.

Having thus fully described my invention, what I claim as new, and desire to secure by Letters Patent, is—

The hoisting-machine described, consisting of the frame-work A, having the permanent chute $a^2$, the cage B, with platform $b$, pulley system $a\ a'\ a^2$, and chain D, adapted for attachment to the cage B and locomotive E, as described.

JOHN B. COLLIN.

Witnesses:
H. W. BEADLE,
WM. T. EMERSON.